(No Model.)
T. A. & W. T. JEBB.
PROCESS OF MANUFACTURING DISTILLED SPIRITS FROM GRAIN.
No. 243,910. Patented July 5, 1881.
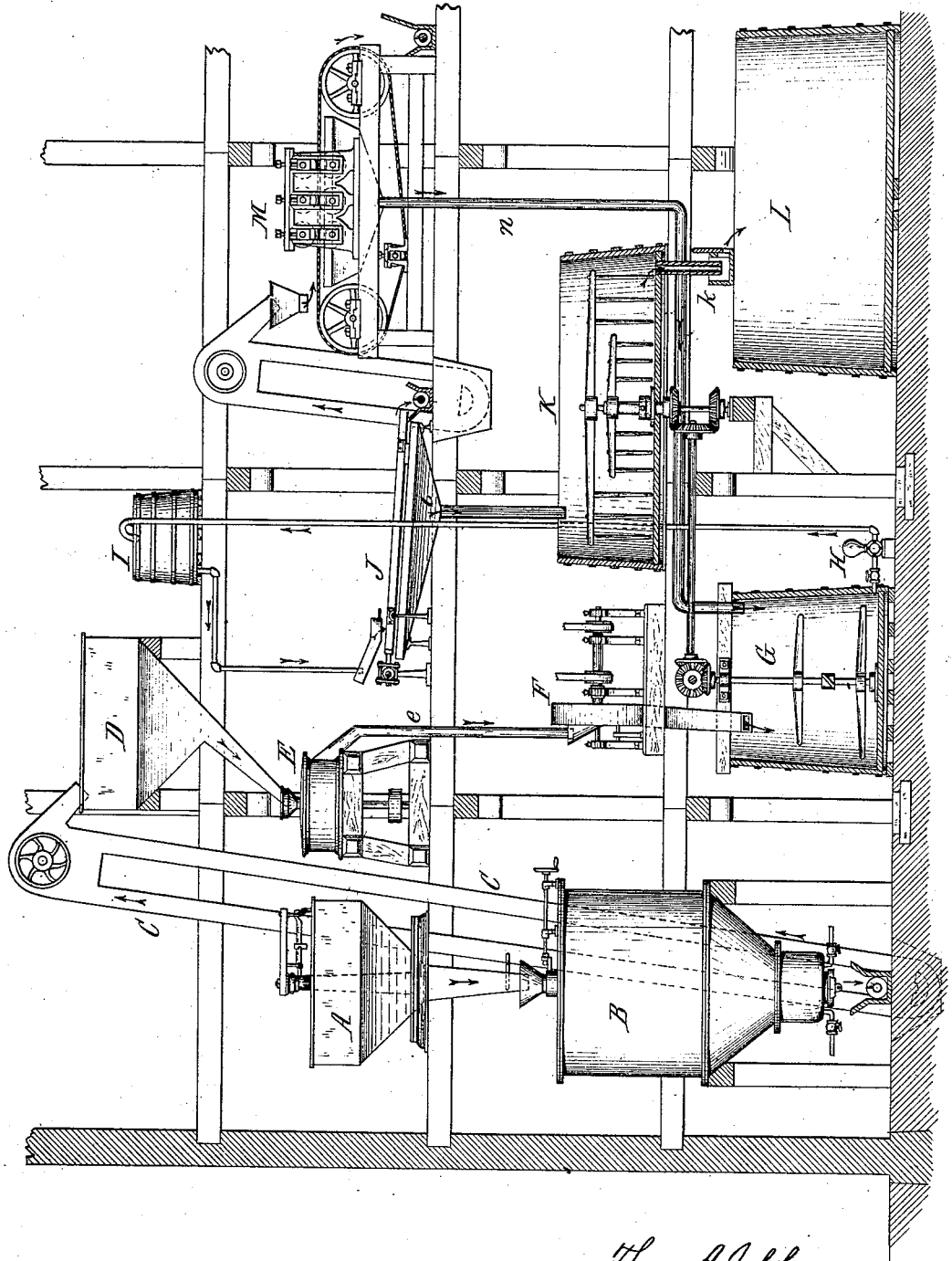

UNITED STATES PATENT OFFICE.

THOMAS A. JEBB AND WILLIAM T. JEBB, OF BUFFALO, NEW YORK.

PROCESS OF MANUFACTURING DISTILLED SPIRITS FROM GRAIN.

SPECIFICATION forming part of Letters Patent No. 243,910, dated July 5, 1881.

Application filed April 20, 1881. (No model.)

*To all whom it may concern:*

Be it known that we, THOMAS A. JEBB and WILLIAM T. JEBB, both of the city of Buffalo, in the county of Erie and State of New York, have invented new and useful Improvements in Processes of Manufacturing Distilled Spirits from Grain, of which the following is a specification, reference being had to the accompanying drawing.

This invention relates to improvements in the art of producing distilled spirits from grain, more especially Indian corn or maize.

Heretofore it has been, and it is now, the general practice to crush or grind the grain and to mash, ferment, and distill all the constituent parts of the crushed or ground grain together, whereby a large amount of impurities or deleterious substances are liberated and mixed with the spirits, from which they are afterward removed to a certain extent by rectification, while a great portion of the more volatile deleterious substances—such as fusel-oil—remain in the rectified spirits, and has to be gradually eliminated by the slow process of aging. In this manner of treating grain for the purpose of distillation the bran and gluten are discharged from the still in the form of slops, which contain such an excessive quantity of water that they are not desirable as feed and cannot be kept for even short periods of time without souring, in consequence of which these slops have no commercial value in warm weather, and are in many localities treated as a waste product and permitted to run off, to the great detriment of localities through which the water-courses run which receive this offal.

The object of this invention is to prevent the liberation of the deleterious substances which are contained in the bran and gluten, and the contamination of the spirits therewith, to preserve the bran and gluten in a form in which they can be advantageously utilized as feed, and to expedite the whole process of manufacture.

Our invention consists, to these ends, in effecting a separation of the bran and gluten from the starchy constituent parts of the reduced grain, and to mash, ferment, and distill the latter parts alone, while the bran and gluten are kept separate and disposed of as feed or otherwise, as may be desirable, as hereinafter fully set forth.

The accompanying drawing represents a sectional elevation of the apparatus or plant employed in manufacturing spirits according to our improved process.

A represents the weigh-hopper, in which the grain to be worked up is weighed, and from which it passes to a steep-tub, B, arranged below the weigh-hopper. The steep-tub B is preferably constructed of iron, in the manner described and shown in Letters Patent of the United States No. 240,907, granted to us May 3, 1881. The grain is steeped in this tub for a sufficient length of time to thoroughly soften the grain, but without causing fermentation to set in. The steep-water is preferably maintained at a temperature of from 120° to 130° Fahrenheit.

C is an elevator, which receives the grain from the steep-tub B after it has reached the desired state of softness and after the water has been drained off. The elevator C carries the grain to a receiver, D, in the upper part of the building.

E represents a grinding-mill, into which the grain is discharged from the receiver D, and by which the grain is ground high, so as to reduce the bran and gluten to coarse fragments, while the starch is reduced more finely. A stream of water is directed into the eye of the runner, in the usual manner, and the product of grinding, together with the water, escapes from the mill through the discharge-spout e.

F represents a disintegrator, which receives the ground grain from the discharge-spout e of the mill E, and in which such portions of the starchy matter as may still adhere to the fragments of bran and gluten are completely detached from these fragments. This method of reducing the grain is more fully described in Letters Patent of the United States No. 239,171, granted to us March 22, 1881, to which reference is here made for a more complete description thereof.

G represents a washing or mixing tub, arranged below the disintegrator F, and receiving the ground and beaten grain from the disintegrator. The tub G is provided with rotating stirrers, whereby a thorough mixing and washing of the grain is effected, and whereby all the starch becomes suspended in the water with which this tub is charged.

H represents a pump, by which the liquid material is taken from the washing-tub G and elevated to a receiver, I, in the upper part of the building.

J represents a shaking sieve, arranged below the receiver I, and receiving the liquid material from the latter. The sieve J effects, by the aid of fine streams of water, which are delivered upon the sieve by suitable pipes, a separation of the starch from the bran and gluten, the latter passing over the tail end of the sieve, while the starch is washed through the perforations of the sieve and collected in a hopper or trough, i, underneath the sieve.

K represents the mash-tub, which receives from the trough i the water which carries the starch in suspension. The mash-tub is of any ordinary and well-known construction, and preferably provided with stirrers revolving in opposite directions. The starchy liquid is first mashed at a temperature of about 180° Fahrenheit, then cooled down to about 160° Fahrenheit, when a quantity of glucose, either in the form of blocks or in granulated or liquid form, is added to the mash in about the proportion of twenty pounds of glucose for every bushel of malt which is added at this stage of the mashing process as it is now practiced. The mash is then cooled to about 150° Fahrenheit, when an additional quantity of glucose may be added to the mash in about the same proportion in which crushed malt or small grains are now sometimes added to the mash at this stage of the process. When the operation of mashing is completed, the mash is conducted by the troughs or pipes k to the fermenting tub or tubs L, in which the yeast is added, if it has not been introduced into the mash in the mash-tub. When the fermentation is complete the beer is charged into the still, and the spirits are distilled off in a well-known manner.

The bran and gluten, which are discharged by the sifting apparatus J, are conducted to a squeezing apparatus, M, in which the wet offal is passed between one or more pairs of rollers, whereby the moisture is pressed out and the offal discharged in a comparatively dry condition, in which it can be preserved sweet for a considerable period of time and transported over long distances. The starchy liquid which is pressed out of the offal is preferably conducted by a pipe, n, to the washing-tub G, if this tub is used, or to the mash-tub K, if the tub G is dispensed with. Although we prefer to use the washing-tub G, its employment is not absolutely essential, and it may be dispensed with and the reduced grain be directly conducted to the sifting apparatus J from the disintegrator F.

It will be seen from the foregoing that in our improved process the bran and gluten are separated from the starch before the operation of mashing is begun, and never afterward again brought in contact with the substance which is fermented and distilled, whereby the following important advantages are gained: The liberation of fusel-oil and similar deleterious substances, which results mainly from the presence of the bran and gluten in the mashed, fermented, or distilled material, is avoided, and the spirits are produced free from these deleterious substances. The bulk of the material which is mashed, fermented, and distilled is greatly reduced by the exclusion of the bran and gluten from these steps in the process. The apparatus employed for mashing, fermenting, and distilling is proportionally reduced in size. The operation of distilling can be carried on less violently or with lower steam-pressure, as the alcohol will more readily pass over into the condensing-worm, and the danger of carrying impurities mechanically over with the alcoholic vapor is correspondingly reduced, the costly rectifying apparatus is relieved of a large amount of its work and can be much reduced in size and capacity, and the spirits will be of better quality and be fit for consumption in much less time than heretofore. The bran and gluten are preserved in a dry condition, in which they can be advantageously disposed of as feed, and the annoyances and drawbacks attending the production of a large amount of unsalable wet offal are thereby avoided.

By the employment of glucose instead of malt or small grains in mashing, the introduction of bran and gluten into the mash is avoided and the operation of mashing is expedited and cheapened.

We claim as our invention—

1. As an improvement in the art of manufacturing distilled spirits from grain, the method which consists in separating the bran and gluten from the starch contained in the reduced grain, and then mashing, fermenting, and distilling the separated starch alone, whereby purer spirits are produced and the bran and gluten are preserved in a more useful condition, substantially as set forth.

2. The herein-described process of manufacturing distilled spirits from grain, which consists in first steeping the grain, then reducing the steeped grain by grinding or beating, then separating the bran and gluten from the starchy liquid by sifting, then mashing, fermenting, and distilling the separated starch alone, substantially as set forth.

T. A. JEBB.
WM. T. JEBB.

Witnesses:
JNO. J. BONNER,
CHAS. J. BUCHHEIT.